Nov. 16, 1965 H. J. ENGELSHER ETAL 3,217,818
PNEUMATIC WEIGHING DEVICE
Filed April 6, 1964 2 Sheets-Sheet 1
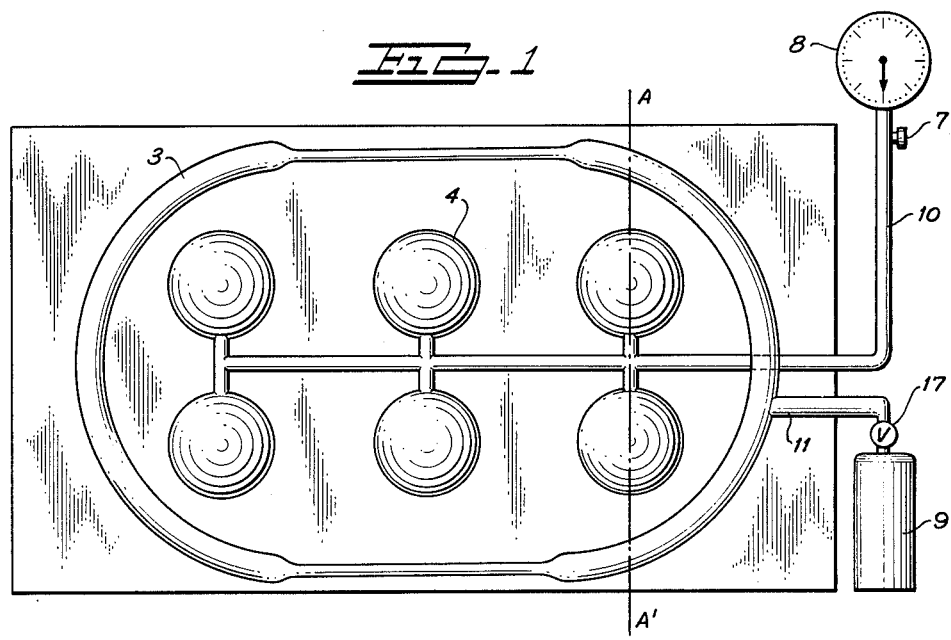
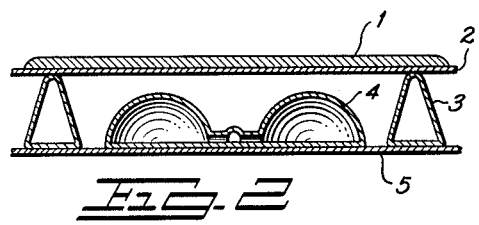
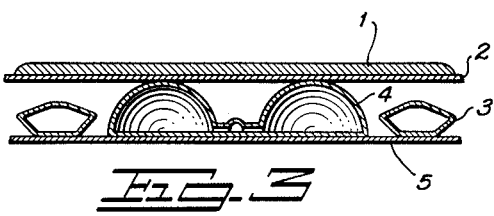
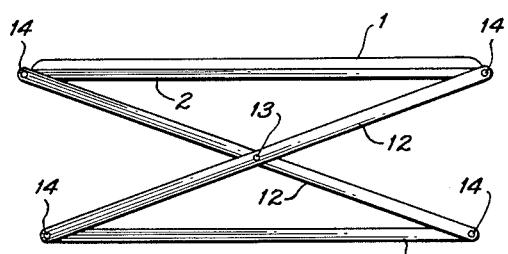
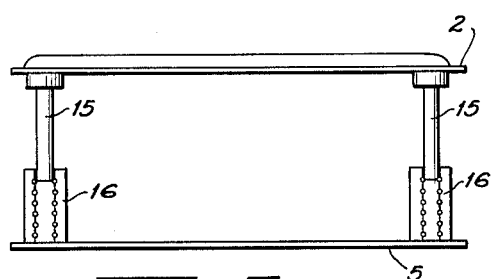
INVENTORS

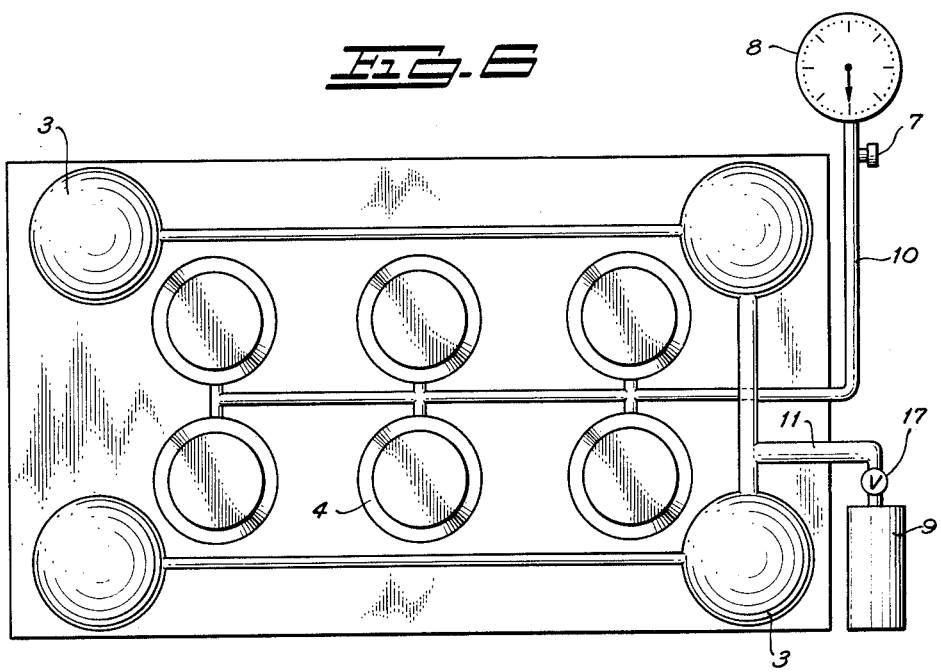

3,217,818
PNEUMATIC WEIGHING DEVICE
Harvey J. Engelsher, 245 Rumsey Road, Yonkers, N.Y.;
Peter C. Hofstra, 149 Haledon Ave., Paterson, N.J.;
and Robert W. McKirdy, 24 Dobbs Terrace, Scarsdale, N.Y.
Filed Apr. 6, 1964, Ser. No. 357,686
5 Claims. (Cl. 177—144)

This invention relates to devices for the weighing of bodies which are comparatively, temporarily or totally immobile, and particularly for the weighing of human being or animals incapacitated by sickness and immobilized in accordance with the judgment of a clinician.

At present, when a patient is to be weighed, it is necessary he must be moved from the bed to a conventional apparatus of the type commonly used in hospitals, such procedure requiring mechanical assistants and nursing personnel. Such weighing apparatus usually consists of a horizontal platform slidably mounted on a vertical column which is attached to a rollable base. The apparatus is strong and heavy because of the cantilever principle employed and must be moved to a position alongside the bed where the weighing platform is then swung over the bed to receive the patient who must be lifted into position. When a patient has been immobilized by the attachment of splints, drainage tubes, bandages, casts, traction devices or intravenous connections, such transferring of a body while in prone position is a procedure precarious to the patient.

The doctor does not require information as to a patient's weight loss or gain in every case, but there are many clinical conditions wherein a change of a patient's weight must be interpreted immediately in order that appropriate remedial action may be prescribed. For instance, the loss of vital or non-vital body fluids can occur invisibly and imperceptibly when the weight of the patient is not being monitored, yet such losses or gains can be continually or periodically monitored if weighing can be carried out without disturbing the patient.

The ease with which this device can be used satisfies the foregoing need and is therefore of advantage to all concerned with the care of the sick.

An object of this invention is to provide a means of weighing a patient without having to disturb the resting position. Briefly described, the weighing device consists of a rectangular box-like mattress having the same superficial dimensions as the bed frame on which it is to be placed. Its outwardly facing surface is a rigid panel suitably covered with some pressure-absorbent material such as sponge rubber or a water or air-filled envelope on which the body to be weighed may rest. To the inwardly facing surface of the lower rigid panel of the mattress, two independent inflatable systems are attached. The systems are of two different volumetric capacities having the larger adapted for supporting the patient's weight clear of the smaller system on which the patient rests only when his weight is being measured.

The larger pneumatic system may be formed as one continuous chamber or may consist of a number of smaller chambers but, in the latter case, the component chambers are interconnected and may therefore be simultaneously inflated or deflated each through a single duct. The body to be weighed rests on the upper surface of the mattress which in turn is supported on the larger pneumatic system when inflated. When weighing is to be carried out the air is exhausted from the supporting system thereby lowering the upper mattress panel until it rests on the smaller system.

The component units of the smaller system like the larger one are air-filled and are interconnected by a tubular duct through which they transmit a varying pressure condition to a pressure gauge. When the upper mattress panel supporting a body comes to rest horizontally on the smaller system, the increased pressure so applied is transmitted through the interconnecting tube to some point at which a pressure gauge has been connected. From this gauge extrapolation of the increased pressure due to the weight of the body may be read in units avoirdupois. The body having been weighed can then be raised to its preweighing position by restoring the original pressure to the larger tubular means.

We have discovered that this method of measuring weight confers an advantage of accuracy not available in commonly accepted weight-measuring techniques. Such advantage is derived from measuring differential pressures relative to a known reference level, namely, the atmosphere. This equilibrium between the interior pressure of the smaller system and that of the atmosphere can be established before each weighing by momentarily opening a duct between the gauge and the smaller system to the atmosphere; the gauge can then be zeroed. We have discovered that the pressure-sensing function of the smaller system after equilibration is very reliable. In zeroing the gauge, the tare of mattress is also compensated for by setting the dial at a reading equivalent to the pressure applied by the tare or net weight of the upper panel of the mattress.

It can be seen from the foregoing description that the weighing device of this invention is simple in design, light in weight, low in cost and easily portable, and that, in nursing situations for instance, because of these desirable features, a wider range of patient care is opened up to the doctors and nursing personnel with corresponding advantages in the treatment of the sick.

In the drawings, FIG. 1 shows the pneumatic weighing device in plan.

FIG. 2 shows a cross-sectional view A–A$^1$ (FIG. 1) of the weighing device wherein 1 is the upholstered surface of the upper mattress panel, 2 a rigid material preferably light in weight and similar to "honeycomb sandwich" which is used in the construction of airplane wings and fuselage. The larger pneumatic means 3 are in position for supporting the load, and the smaller pneumatic means 4 are attached to the inwardly facing surface of the lower mattress panel 5. A check valve 7 is fitted to the gauge 8 and duct 10 so that the pressure in the pneumatic line and tubes may be equilibrated with that of the atmosphere. The air pressure reservoir 9 supplies the larger pneumatic system by means of duct 11 through valve control means 17.

FIG. 3 shows the apparatus at the moment the load is supported on the smaller pneumatic or indicating system.

FIG. 4 shows an alternate method of controlling the movement of upper mattress panel 2 parallel to the lower mattress panel 5 by means of arms or rods 12 pivoted on fulcrum pin 13 and slidably attached to their respective upper and lower plates along all four edges by means of pins 14.

FIG. 5 shows another method of controlling the parallel relationship of panels 2 and 5 by means of guide pins 15 attached to the upper panel and sliding axially within the ball bushings 16 attached at their lower extremities to panel 5.

FIG. 6 shows an alternate form of the larger pneumatic system 3.

FIG. 7 shows an alternate bellows form of the smaller pneumatic system 4.

It is conceivable that the design and description set forth herein may be modified without departing from the spirit of the invention or from the purpose of the inventors. They state, moreover, that there are fields other than that of hospital service, already herein described, in which the novelty of their weighing device will be recognized as a signal advance in the technology of weight and pressure measurement. For instance, it can be expected that the weighing of animals for zoological or veterinary determinations will be greatly facilitated by the use of this invention. Other applications concerned with the movement and measurement of living or inert matter having dead-weight characteristics or not readily mobile will occur to one acquainted with such conditions. The measurement of weight in post mortem examinations can be carried out quickly and accurately with use of our invention.

Having described the purpose and the attributes of our invention therefore, we claim as follows:

1. A device for measuring weight or pressure comprising a first rigid platform and a second rigid platform each having at least one planar or flat surface facing and parallel to the said planar or flat surface of the second platform, said first platform having conveniently disposed thereupon inflatable and deflatable airtight means, said airtight means having a commonly contained air capacity communicable with the atmosphere by means of a tube or duct having an externally closable port in the wall thereof, said tube or duct being connected at its outward termination to a measuring device suitable for indicating a pressure or weight when electively applied against the outwardly facing surface of either the said first or the said second platform, and having said second platform separated from said first platform by the interposition of a second inflatable and deflatable airtight means, by means of the inflation or deflation of which the intersurface distance of the said first and second platforms may be controllably adjusted.

2. A device according to claim 1 having alternative means for maintaining or adjusting the position of said first or second rigid platform in parallel relationship to each other consisting of at least two pairs of metal or other strips each pair having a common centrally mounted pin about which the said metal or other strips are free to rotate, said strips being equal in length and connected each at its outward extremities to diagonally located pins affixed to the edges of the said platforms, said pins so connected to said strips as to permit each strip of its being slidably moved at right angles to the axis of the said pins.

3. A device according to claim 1 having alternative means for maintaining or adjusting the parallel position of said first relative to said second rigid platform by means of a rigid bushing or bushings attached to the inwardly facing surface of one of the said rigid platforms and by means of a mating pin or pins attached to the inwardly facing surface of the other rigid platform, both bushing and mating pin of each pair having a center point of attachment congruent the one to the other, said mating pin of any one pair having an outside diametrical measurement such that its axial movement within its mating bushing is slidably facilitated.

4. A device according to claim 1 wherein each of said second inflatable and deflatable means components is in form of a bellows.

5. A device according to claim 1 wherein each of said second inflatable and deflatable means components is in form of an annular tube.

References Cited by the Examiner
UNITED STATES PATENTS

| | | | |
|---|---|---|---|
| 1,458,920 | 6/1923 | Troll | 177—208 X |
| 2,051,042 | 8/1936 | Hendel et al. | 177—209 |
| 2,269,969 | 1/1942 | Branick | 177—208 |

FOREIGN PATENTS

| | | |
|---|---|---|
| 218,636 | 11/1958 | Australia. |
| 530,180 | 7/1955 | Italy. |
| 578,341 | 8/1958 | Italy. |

LEO SMILOW, *Primary Examiner.*

LEYLAND M. MARTIN, *Examiner.*